Figure 7:
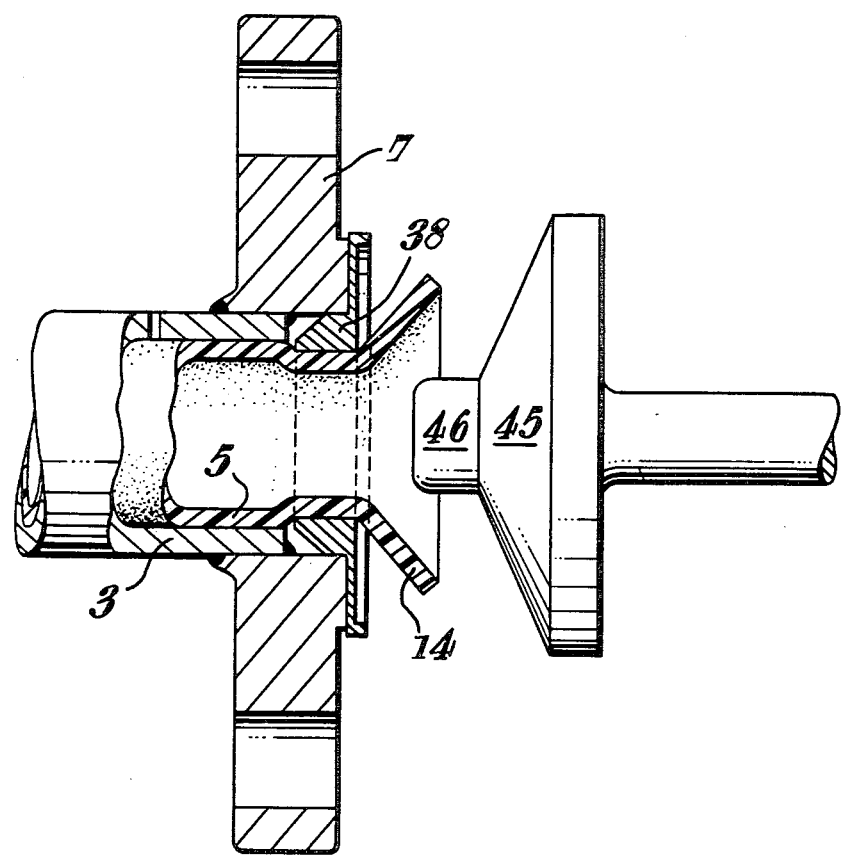

United States Patent [19]
Davies

[11] 4,281,859
[45] Aug. 4, 1981

[54] PIPE JOINTS

[75] Inventor: Pamela M. Davies, East Preston, England

[73] Assignee: Le Carbone (Great Britain) Limited, England

[21] Appl. No.: 926,296

[22] Filed: Jul. 20, 1978

Related U.S. Application Data

[62] Division of Ser. No. 695,761, Jun. 14, 1976, Pat. No. 4,127,287.

[30] Foreign Application Priority Data

Jan. 9, 1976 [GB] United Kingdom ............ 00773/76

[51] Int. Cl.³ .............................................. F16L 9/14
[52] U.S. Cl. ...................................... 285/55; 285/14; 285/351; 285/363; 285/416; 285/DIG. 18
[58] Field of Search ................. 285/55, 363, 405, 416, 285/351, 14, DIG. 18

[56] References Cited

U.S. PATENT DOCUMENTS

| | | | |
|---|---|---|---|
| 2,201,862 | 5/1940 | Heisterkamp | 285/55 |
| 2,356,047 | 8/1944 | Geisinger et al. | 285/363 X |
| 2,592,419 | 4/1952 | Harper et al. | 285/55 X |
| 2,998,984 | 9/1961 | Gressel | 285/55 |
| 3,248,108 | 11/1966 | West | 285/55 |

FOREIGN PATENT DOCUMENTS

| | | | |
|---|---|---|---|
| 2051113 | 4/1972 | Fed. Rep. of Germany | 285/55 |
| 2427763 | 12/1975 | Fed. Rep. of Germany | 285/342 |
| 883048 | 3/1943 | France | |
| 1222943 | 1/1960 | France | |
| 7144859 | 4/1973 | France | |

Primary Examiner—Dave W. Arola
Attorney, Agent, or Firm—Roylance, Abrams, Berdo & Farley

[57] ABSTRACT

The invention relates to means and methods for rendering fire-safe, or more fire-safe, steel or like pipework which is lined with a plastic or like liner. At joints in such pipework, the liner is brought out over the flange face to form the actual seal. Consequently, the liner is vulnerable to fire or other forms of external heat at the joints.

In accordance with the present invention, a metal ring is provided around the periphery of the liner at each joint to protect the liner from fire. The metal ring is not intended to provide a complete seal if the seal between the liners should fail, but is does prevent any large escape of the contents of the pipework.

The ring may take various forms and may be, for example, a resilient ring of either U-section or M-section. Alternatively, the ring may be of flat-section and may slide on lips formed on inserts arranged between the flanges and the liners. These inserts may be arranged to provide the additional advantage of removing the need for special flange welding and machining.

3 Claims, 7 Drawing Figures

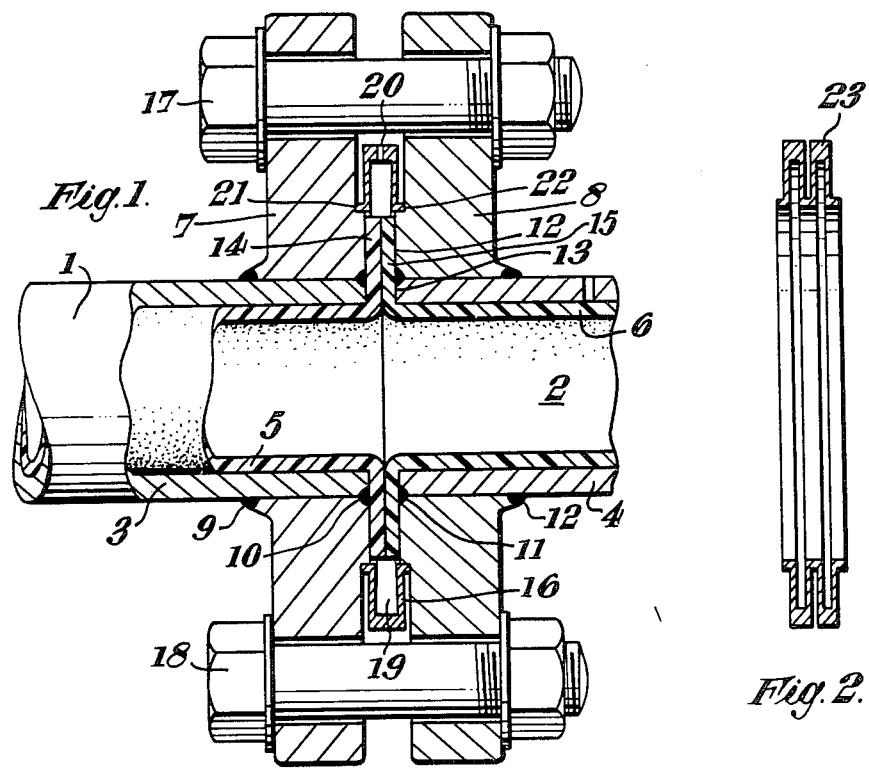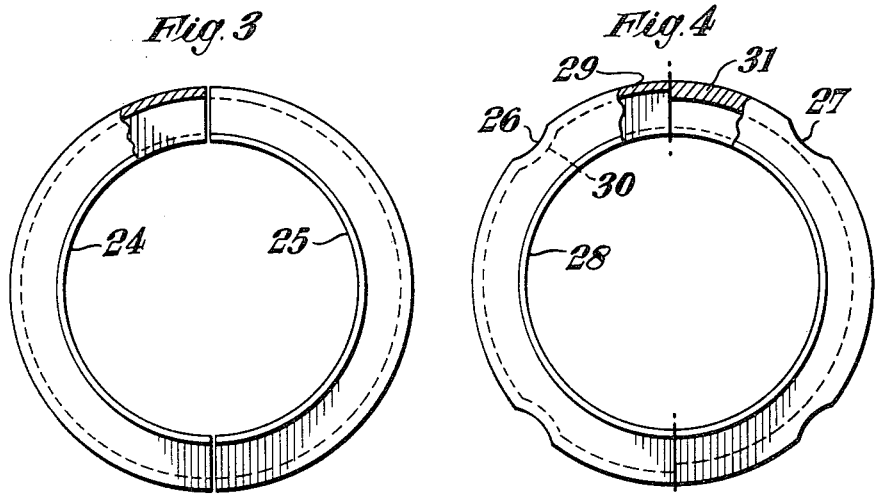

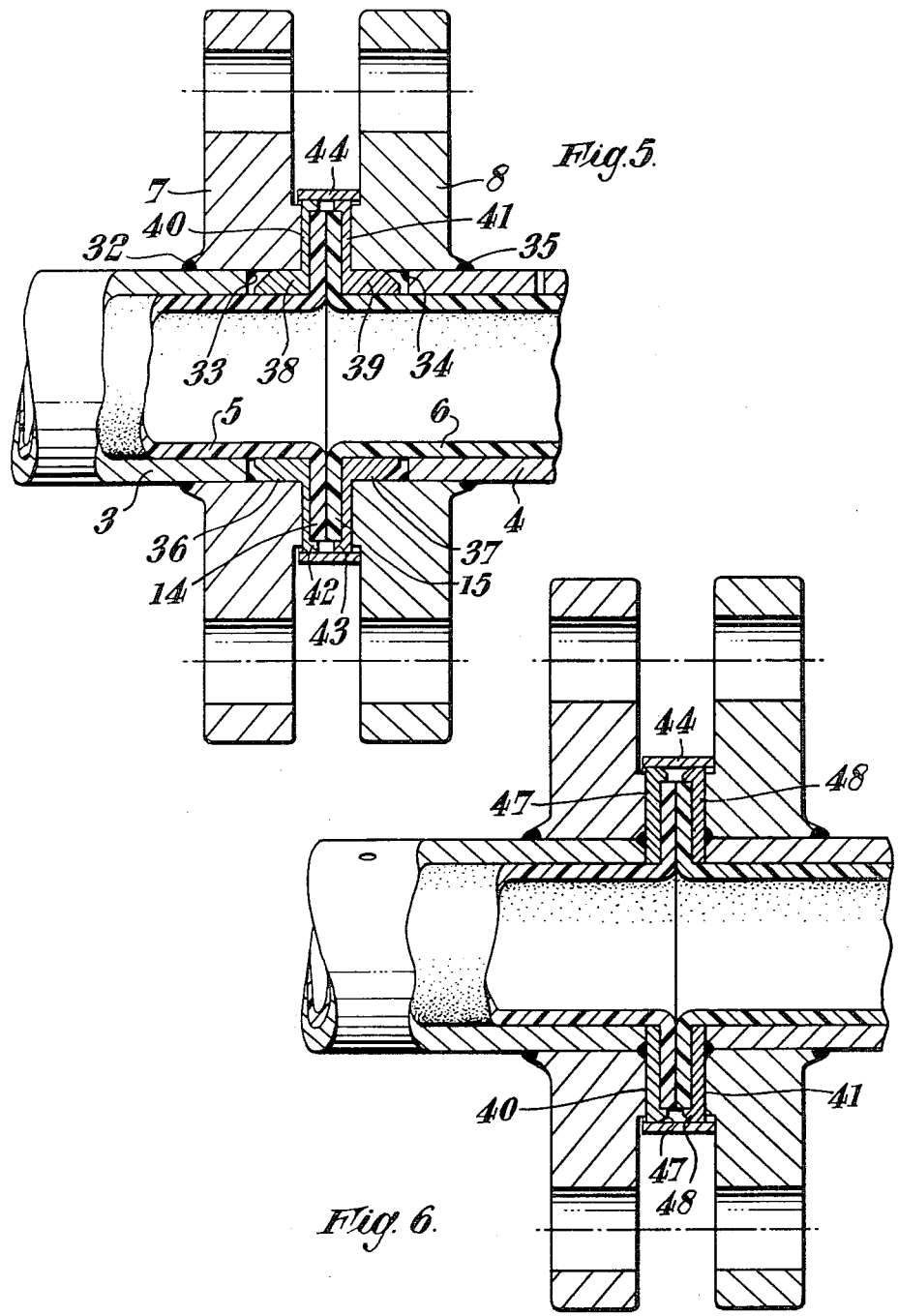

PIPE JOINTS

This is a division of application Ser. No. 695,761, filed June 14, 1976, now Pat. No. 4,127,287 issued 11/28/78.

This invention relates to joints between pipe sections of the kind which comprise an outer metal pipe with an inner liner of rubber or synthetic resin material. Such pipes are used in the chemical and other industries to combine the advantages of the mechanical strength of the metal pipe with the corrosion and contamination resistance of the lining material.

The term pipe section is used herein to include not only straight lengths of pipework, but also elbows, tees, crosses, valves and the like.

When two sections of lined pipe are to be joined, it is the normal practice to provide each pipe section with a metal flange and to arrange the liner of each section so that it projects from the end of the pipe beyond the flange. The projecting portion of the liner is deformed so that it is parallel with the flange faces and the two flanges are then drawn together, for example, by means of bolts or the like, so that the flared outer portions of the liners form a seal between the two sections. Under normal circumstances, this arrangement ensures that the contents of the pipework come into contact only with the liner. However, in the event of a fire, or any other form of exterior heating, the flared portions will be subject to an increased temperature and, since rubber and synthetic resin materials generally have a lower melting point than the metal used for the outer pipes, the liners may melt or otherwise disintegrate, so that the seal between the pipe sections is broken. If the contents of the pipework are under pressure and are inflammable, they will be forced out through the joint and will provide fuel for the fire. Alternatively, or in addition, if the contents of the piping are corrosive or toxic, they will constitute a further hazard.

It is an object of the present invention to reduce the danger of large quantities of liquid being forced out of a joint between two pipe sections when the joint is subjected to overheating.

It is a further object of the invention to provide a method of joining pipe sections which is safer than the methods currently in use.

It is a further object of the invention to provide a secondary seal for a joint between the two pipe sections, which seal will reduce leakage from the joint in the event of failure of the primary seal.

From one aspect the invention consists in a joint between two pipe sections, each of which includes an outer metal pipe and an inner liner of rubber or synthetic resin material, wherein metal jointing flanges are provid on the adjacent ends of the pipe sections, wherein the liner extends from the interior of each pipe section to form a liner extension covering a portion of the respective flange, and wherein means are provided to urge the flanges towards one another so that a seal is formed between the mating faces of the two liner extensions, the improvement which consists in providing a metal ring between the flanges, said metal ring covering the liner extensions to reduce leakage from the joint in the event of failure of the seal between the liner extensions.

From another aspect the invention consists in a method of forming a joint between two pipe sections, each of which includes an outer metal pipe with an inner liner of rubber or synthetic resin material having an extension thereof projecting from the end of the pipe, said method comprising the steps of:

providing metal jointing flanges on the adjacent ends of the two pipe sections;

deforming the extension of the liner of each pipe section so that it covers a portion of the respective flange;

fitting a metal ring over the liner extension of one of said pipe sections;

offering up the other pipe section to said one pipe section so that the liner extension of said other pipe section enters said ring; and drawing the two flanges together to form a seal between the opposed faces of the two liner extensions.

From yet another aspect the invention consists in a method of improving a joint between two pipe sections, each of which includes an outer metal pipe with an inner liner of elastomeric material having an extension flared over to provide a seal between the two sections, said improvement consisting in the steps of:

opening the joint and separating the two pipe sections, fitting a metal ring around the periphery of the liner extensions;

re-closing the joint with the metal ring in position.

Methods of performing the invention will now be described with reference to the accompanying diagrammatic drawings, in which:

FIG. 1 is a sectional side view of a joint in accordance with the invention,

FIG. 2 is a sectional side view of an alternative ring for use in a joint as illustrated in FIG. 1, FIGS. 3 and 4 are front elevations, partly in section, of further alternative rings for use in the joint illustrated in FIG. 1, FIG. 5 is a sectional side view of a second embodiment of the invention, FIG. 6 is a sectional side view of a third embodiment of the invention, and FIG. 7 is a sectional side view illustrating one step in the formation of a joint of the kind shown in FIG. 5.

FIG. 1 shows a joint between two pipe sections 1 and 2 which consist respectively of outer metal pipes 3 and 4 and inner liners 5 and 6. The outer metal pipes may consist, for example, of steel, and the inner liners may consist, for example, of polytetrafluorethylene. A metal flange 7 is welded onto the end of the metal pipe 3 and a metal flange 8 is welded onto the end of the pipe 4. The welds are shown, for example, at 9, 10, 11 and 12. After the welds 10 and 11 have been formed, they are machined or ground so that a flat surface is formed on the end of each section. This flat surface consists, for example, of the raised face 12 of the flange 8, the weld 11 and the end 13 of the pipe 6.

After the flat faces have been formed, the liners 5 and 6 are inserted in the metal pipes 3 and 4 with the portions projecting from the ends of the respective pipes. These projecting portions are then deformed to form flares as shown at 14 and 15.

A ring 16 consisting of spring steel, is placed over one of the flares and the two pipe sections are then butted up together with the two flares in contact and with the ring 16 in position around the flares as shown in FIG. 1. The flanges are then drawn together by means of nuts and bolts such as those shown at 17 and 18. It is, of course, to be understood that there will be four or more bolts arranged around the periphery of the flanges in accordance with normal practice.

It is possible that, when the joint is first put into service, some liquid will seep out from the junction between the two flares 14 and 15. This liquid will then enter the channel 19 in the ring 16. To allow this liquid to disperse, it is preferable that drain holes, such as that shown at 20, should be provided in the ring 16. When the joint is actually in service, the nuts and bolts will normally be tightened somewhat further and this tightening will seal the joint so that no further liquid will escape under normal circumstances.

If a fire should occur in the plant which includes the joint as illustrated the ring 16 will prevent any flames from actually coming into contact with the flares 14 and 15. Furthermore, the ring will provide some degree of insulation to reduce the heat to which the flares will be submitted. If, however the heat becomes so intense that the synthetic resin material of the flares does commence to melt, the material will flow into the channel 19 and will block the drain holes 20, thus increasing the protection provided by the invention for the main portion of the flares 14 and 15.

It is to be understood that the dimensions, strength, and resilience of the ring 16 should be such that the two legs 21 and 22 are urged against the faces of the two flanges when the bolts 17 and 18 have been tightened. On the other hand, the resistance to deformation of the ring should not be sufficient to interfere with the normal tightening of these bolts. Further, it will be seen that the ring as illustrated has an outer wall which is thicker than the two legs of the ring. This thicker outer wall is provided to prevent the flanges being drawn too close together in the event of the joint becoming bent, for example, as a result of excessive pressure on one side of the joint.

FIG. 2 shows an M-section ring 23 which may be used, if desired, in place of the U-section ring 16 shown in FIG. 1, in order to provide additional flexibility.

FIG. 3 shows a ring similar to that illustrated in FIG. 1 except that it is diametrically split to form two halves 24 and 25. A ring of this kind is particularly useful if it is desired to protect an existing joint by means of the present invention. Thus, an existing joint may be opened a relatively short distance and the two halves 24 and 25 inserted around the periphery of the flared portions of the liner. When the bolts are retightened, the two halves will be held in position by the resilience of the legs of the ring. Further, if by any chance excessive pressure should develop as a result of a leakage occuring at the joint, the two halves of the ring can only be separated a short distance before they are held by the bolts such as those shown at 17 and 18 in FIG. 1.

In some instances, the space available between the periphery of the flared ends of the liners and the ring of bolts may be insufficient to accommodate a ring of the desired size. In these circumstances, it will be desirable to use a ring of the general kind shown in FIG. 4. In this case, the ring is provided with depressions such as those shown at 26 and 27 in the outer wall of the ring to accommodate the respective bolts. The left-hand side of FIG. 4 shows a ring 28 having a relatively thin outer wall 29 and, in this case, the depression 26 is formed by bending the outer wall inwardly as shown at 30. The right-hand half of FIG. 4, on the other hand, shows a ring having a relatively thick wall 31 and, in this case, the depression 27 is formed by removing material from the outside of this wall.

As has already been explained in connection with FIG. 1, the normal method of forming a joint between two sections of lined pipe includes the step of grinding the weld at the end of the pipe in order to provide a flat face around which the liner can be bent to form the actual seal. In order to avoid the necessity for this grinding operation, it is proposed, in accordance with a feature of the present invention, to replace the co-planar arrangement of the flange and the pipe end shown in FIG. 1 by a stepped arrangement as shown in FIG. 5. In this embodiment, the flanges 7 and 8 are welded in position on the ends of the pipes 3 and 4 by means of welds 32, 33, 34 and 35. Since the flanges 7 and 8 are welded on the ends of the respective pipes, the welds 33 and 34 do not need to be ground. On the other hand, in order to provide the required flat surfaces for supporting the liners 5 and 6, inserts 36 and 37 are fitted within the flanges. These inserts include annular portions 38 and 39 respectively, to provide support for portions of the liners co-axial with the pipes, and flat portions 40 and 41 to support the flare portion of the liners. Preferably, the inserts also include lips 42 and 43 which engage the peripheries of the flare portions of the liners.

In this embodiment of the invention, the secondary seal for the joint is provided by a flat-section ring or sleeve 44, which is a sliding fit on the lips 42 and 43. The width of this ring is somewhat less than the gap between the two flanges 7 and 8 after they have been drawn together to form the seal by means of nuts and bolts (not shown). Thus, the ring 44 does not interfere with the normal bolting-up of the joint.

In forming a joint as shown in FIG. 5, the adjacent ends of the two pipe sections are initially prepared by the provision of the inserts 38 and 39 and by deforming the liners 5 and 6 around the inserts to form the flared portions 14 and 15. Thereafter, the ring 44 is fitted over the lip of one of the inserts and the two sections are drawn together so that the lip on the other insert enters the ring. As the bolts are tightened to draw the two flanges together, the second lip slides within the ring 44.

FIG. 7 illustrates one step in the formation of the joint shown in FIG. 5. This figure shows the pipe 3 with the flange 7 welded in position on it and also shows the insert 38 in position. The liner 5 is shown in the process of being deformed by means of a tool 45, to form the flare 14. It is to be understood that the liner is deformed by a succession of tools such as that shown at 45, each successive tool having a larger apex angle so that it turns the flare through a larger angle.

It will be seen that the pipe 3 is shown as having a larger interior diameter than the insert 38. This difference is exaggerated in the drawing, but it is in practice found that the interior diameters of pipes of any particular exterior diameter do vary by quite large amounts. Accordingly, in practice, it is necessary to stock a large number of different tools of each particular apex angle, the noses 46 of said tools having different diameters to suit the different interior diameters of the pipes. Accordingly, it is an incidental advantage of the present invention that only one set of tools need be used for pipes of any one particular exterior diameter since the nose of the tool engages only the portion of the liner 5 within the insert 38. Thus, inserts can be manufactured with accurately diamensioned interior diameters and can be used with pipes having varying interior diameters.

FIG. 6 shows that an embodiment of the invention generally similar to that illustrated in FIG. 5 can also be used with joints in which the flanges are welded on the pipe ends with their raised faces flush with the ends of the pipe. In this case, inserts 47 and 48 are used in place of the insert 36 and 37, and it will be seen that they are generally similar, except that they do not include the annular portions 38 and 39. They do however, still include the flat portions 40 and 41 and lips 47 and 48. It will be seen that these lips 47 and 48 differ slightly from the lips 42 and 43 of FIG. 5 in that they are chamfered to assist in the fitting of the ring 44. It is of course, to be understood that this chamfered arrangement could be provided equally on the inserts 36 and 37 of FIG. 5.

It will be understood that the invention provides a method of making fire-safe or more fire-safe, steel or like pipework which is lined with a rubber, plastic or like liner. The additional ring which is provided in accordance with the invention protects the rubber or plastic flares between the flanges and prevents any large flow of the contents of the pipework from a damaged joint.

The rings can be readily fitted either to new joints or to existing joints, and can be supplied in a range of widths to suit most variations in liner thicknesses. In the case of the resilient type of ring, the legs should be compressed when the rings are fitted, but the outer thick wall section should be clear of the flanges. In the case of the sliding ring, the insert holds the ring loosely, but firmly, in place. Furthermore, the use of an insert removes problems relating to variations in bore sizes of the pipework when flaring or like tools are used to enter the ends of the pipes. The inserts can be manufactured with similar bore sizes so that, over the length of the socket on the tool that enters the pipe, the bores will be virtually constant, removing the need for different tool sizes.

Although specific apparatus has been shown for the purpose of describing applicant's invention, it will be apparent by those skilled in the are that other variations and modifications in the specific structure illustrated may be made without departing from the spirit and scope of the present invention which is limited only to the appended claims.

What is claimed is:

1. In a joint between two pipe sections, each pipe section being of the type including an outer metal pipe and an inner liner of rubber or synthetic resin material, wherein metal jointing flanges are provided on the adjacent ends of the pipe section, and wherein each liner extends from the interior of its associated pipe section radially outwardly to form a liner extension between portions of the respective flanges and terminating in generally annular surfaces, the joint including means for urging the flanges towards one another so that a seal is formed between the mating faces of the two liner extensions lying between the flange portions, the improvement comprising an annular metal ring between substantially planar, parallel faces of the jointing flanges and radially outwardly of the liner extensions, and first and second generally annular metal inserts, each of said inserts having a portion lying between one of said flanges and one of said liner extensions, each of said inserts further including an axially protruding peripheral lip forming sliding sealing contact with an inner surface of said annular ring such that the combination of said metal inserts and metal ring reduces leakage from the pipe joint in the event of failure of the seal between said liner extensions as a result of external fire.

2. A joint according to claim 1, wherein each of said inserts includes an annular portion located radially inwardly of the respective flange.

3. A joint between two pipe sections, each of which includes an outer metal pipe and an inner liner of corrosion-resistant material, wherein metal jointing flanges are welded on the adjacent ends of the pipe sections with a portion of each flange projecting beyond the end of the respective pipe section, and wherein an insert is provided within each flange, the joint further comprising means for urging the flanges toward each other, said insert comprising an annular portion located radially inwardly of the respective flange, a disc-like portion in contact with the outer face of the flange and peripheral lip located radially outwardly of the disc-like portion, wherein the liner extends from the interior of each pipe section to form a liner extension covering said disc-like portion of the respective insert, wherein the flanges are urged towards one another so that a seal is formed between the mating faces of the two liner extensions, and wherein an annular metal sleeve is slidably located and sealingly engaged on the lips of said two inserts such that the combination of said metal inserts and metal ring reduces leakage from the pipe joint in the event of failure of the seal between said liner extensions as a result of external fire.

* * * * *